United States Patent [19]

Bogorad et al.

[11] Patent Number: 5,283,592
[45] Date of Patent: Feb. 1, 1994

[54] ANTENNA SUNSHIELD MEMBRANE

[75] Inventors: Alexander Bogorad, Plainsboro; Charles K. Bowman, Jr., East Windsor; Martin G. Meder, Hightstown, all of N.J.; Frank A. Dottore, Strafford, Pa.

[73] Assignee: General Electric Co., East Windsor, N.J.

[21] Appl. No.: 623,148

[22] Filed: Dec. 5, 1990

[51] Int. Cl.$^5$ .......................... H01Q 1/4; H01Q 1/28
[52] U.S. Cl. .......................... 343/872; 343/DIG. 2
[58] Field of Search ............... 343/DIG. 2, 872, 720, 343/781 R, 832, 912, 909; H01Q 1/02, 1/28, 1/40, 1/42, 15/00-15/02, 17/00-19/02

[56] References Cited

U.S. PATENT DOCUMENTS

| | | | |
|---|---|---|---|
| 3,295,131 | 12/1966 | Hollingsworth | 342/1 |
| 3,396,400 | 8/1968 | Kelly et al. | 343/872 |
| 4,420,757 | 12/1983 | Ebneth et al. | 343/912 |
| 4,479,131 | 10/1984 | Rogers et al. | 343/872 |
| 4,666,760 | 5/1987 | Hasuda et al. | 428/215 |
| 4,741,778 | 5/1988 | Horie et al. | 106/287.16 |
| 4,763,133 | 8/1988 | Takemura et al. | 343/912 |
| 4,789,868 | 12/1988 | Dono et al. | 343/912 |

FOREIGN PATENT DOCUMENTS 0253702 10/1988 Japan ............... H01Q 1/42

OTHER PUBLICATIONS

Bouquet et al., Ground Radiation Tests and Flight Atomic Oxygen Tests of Ito Protective Coatings for Galileo Spacecraft, IEEE Trans. on Nuclear Science, vol. NS-33, No. 6, Dec., 1986, pp. 1408-1412.

C. Bowman et al., Ito-Coated RF Transparent Materials for Antenna Sunshields-Space Environment Effects, IEEE Trans. on Nuclear Science, vol. 37, No. 6, Dec. 1990, pp. 2134-2137.

Primary Examiner—Rolf Hille
Assistant Examiner—Peter T. Brown
Attorney, Agent, or Firm—W. H. Meise; C. A. Berard; S. A. Young

[57] ABSTRACT

An RF-transparent sunshield membrane covers an antenna reflector such as a parabolic dish. The blanket includes a single dielectric sheet of polyimide film ½-mil thick. The surface of the film facing away from the reflector is coated with a transparent electrically conductive coating such as vapor-deposited indium-tin oxide. The surface of the film facing the reflector is reinforced by an adhesively attached polyester or glass mesh, which in turn is coated with a white paint. In a particular embodiment of the invention, polyurethane paint is used. In another embodiment of the invention, a layer of paint primer is applied to the mesh under a silicone paint, and the silicone paint is cured after application for several days at room temperature to enhance adhesion to the primer.

4 Claims, 2 Drawing Sheets

ANTENNA SUNSHIELD MEMBRANE

The Government has rights in this invention pursuant to Contract No. NAS5-3053 with NASA.

BACKGROUND OF THE INVENTION

This invention relates to RF-transparent electrically conductive thermal membranes or blankets for protection of antennas against thermal effects from sources of radiation such as the sun.

An antenna including a parabolic reflector can, if pointed at a source of radiation such as the sun, focus the energy from the sun onto the reflector's feed structure, possibly destroying the feed. Also, the reflector may be heated in such a manner that mechanical distortion or warping occurs, which may adversely affect proper operation.

When the antenna is mounted on a satellite as illustrated in FIG. 1, a fluence of charged particles may cause electrostatic potentials across portions of the antenna made from dielectric materials. If the potentials are sufficiently large, electrostatic discharges (ESD) may occur, resulting in damage to sensitive equipments.

A sunshield adapted for use across the aperture of a reflector antenna should significantly attenuate passage of infrared, visible and ultraviolet components of sunlight to the reflector, should have a conductive outer surface to dissipate electrical charge buildup which might result in electrostatic discharge (ESD), and should be transparent to radio-frequency signals (RF), which for this purpose includes signals in the range between the UHF band (30 to 300 MHz) and Ku band (26 to 40 GHz), inclusive.

Prior art multilayer sunshields which include plural layers of aluminized polyimide film such as Kapton film cannot be used, because they are opaque to RF at the above-mentioned frequencies. An RF-transparent multilayer blanket is described in a copending application entitled "RF-TRANSPARENT SPACECRAFT THERMAL CONTROL BARRIER", filed Dec. 5, 1990 in the names of Munro, III et al. and assigned Ser. No 07/623,144. A multilayer blanket may be disadvantageous because absorbed heat can become trapped among the several layers. The temperature of the layers rises, and they produce infrared radiation which can impinge on the reflector, thereby causing the reflector to overheat.

U.S. Pat. No. 4,479,131, issued Oct. 23, 1984 to Rogers et al., describes a thermal protective shield for a reflector using a layer of germanium semiconductor on the outer surface of a sheet of Kapton, with a partially aluminized inner surface, arranged in a grid pattern which is a compromise between RF transmittance and solar transmittance. To the extent that this arrangement allows solar transmittance, the shield and/or the reflector may heat. Such heating may not be controllable because the reflectivity of the aluminized sheet may reflect infrared from the reflector back toward the reflector, and also because both the germanium and aluminization have low emissivity.

FIG. 2 illustrates a cross-section of another RF-transparent prior art sunshield, which consists of one layer of structure. The one layer of structure includes a two-mil (0.002 inch) black Kapton film 210, reinforced with adhesively-affixed Dacron polyester mesh 212 on the side facing the reflector, and with the space-facing side painted to a thickness of about four mils with a white polyurethane paint 214 such as Chemglaze Z202, manufactured by Lord Corporation of 2000 West Grandview Boulevard, Erie, Pa. 16512. The surface of the paint is vapor coated with an electrically conductive layer 216 such as $75\pm25$Å of indium-tin oxide (ITO). Such a sunshield, immediately after manufacture, has solar absorptivity $\alpha$, averaged over the visible spectrum, between 2.5 and 25 microns, of about 0.3, an emissivity ($\epsilon$) of about 0.8, and a surface resistivity in the range about $10^6$ to $10^8$ ohms per square. It has two-way RF insertion loss of 0.24 dB.

It has been discovered that exposure of the above described single-layer sunshield to a fluence of charged particles and solar ultraviolet radiation causes a gradual degradation. The on-orbit data, together with simulation data, suggest that in the course of a 10-year mission, $\alpha$ increases from about 0.3 to about 0.85, and surface resistivity increases to about $10^9$ ohms per square. Such an increase in absorptivity may cause the single-layer sunscreen to produce infrared radiation, which may cause the antenna reflector to overheat. The increase in surface resistivity may result in ESD. New generations of satellites are intended to have mission durations much exceeding ten years, so the prior art sunscreen cannot be used. An improved sunscreen is desired.

SUMMARY OF THE INVENTION

A sunscreen according to the invention consists of a single structured layer. The layer comprises a transparent dielectric film coated on the space-facing side with an electrically conductive coating such as a vapor-deposited ITO having a thickness of less than about 100Å. The inner side of the film is painted with white paint. In a particular embodiment of the invention, the white paint is a cured polyurethane paint, which may be degraded in the presence of a fluence of charged particles and ultraviolet radiation. In this particular embodiment, the dielectric film is transparent Kapton polyimide film about ½-mil (0.0005 inch) thick, which absorbs ultraviolet light, and which prevents the charged particles from reaching the paint, whereby the paint does not degrade excessively over time. In a further embodiment of the invention, the single layer comprises a reinforcing mesh of Dacron polyester fiber adhesively affixed to the inner surface of the Kapton film, with the polyurethane paint applied over the mesh. In a further embodiment of the invention, the polyurethane paint is Chemglaze Z202, cured at room temperature (air cured) for seven days.

DESCRIPTION OF THE INVENTION

Figure 1:
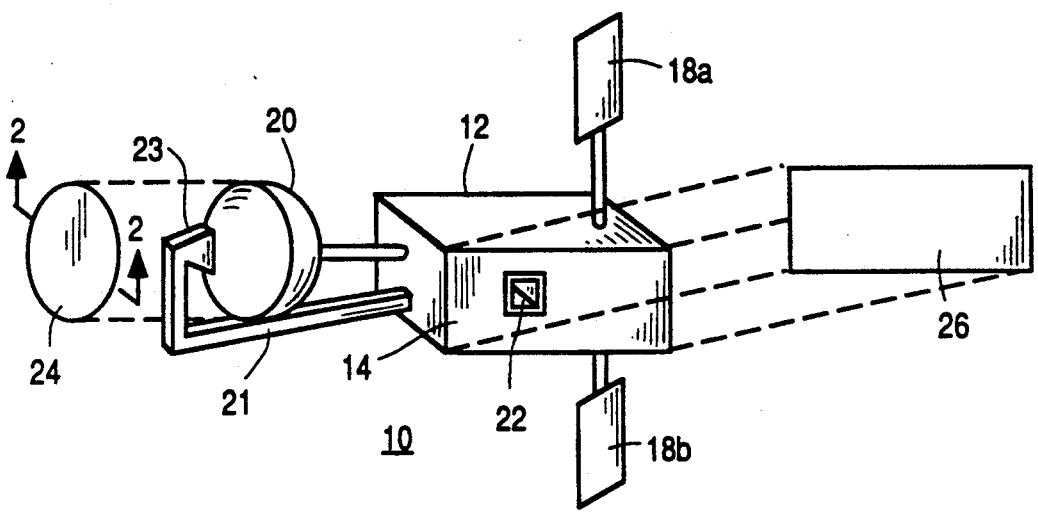
FIG. 1 is a perspective or isometric view of a reflector mounted on a spacecraft, with a sunscreen as being exploded away from the reflector to show details.

In FIG. 1, a spacecraft designated generally as 10 includes a body 12 having a wall 14. First and second solar panels 18a and 18b, respectively, are supported by body 12. A reflector antenna 20 including a feed cable 21 provides communications for satellite 10. Feed cable 21 terminates in a reflector feed 23 at the focal point of reflector 20.

As mentioned above, if reflector 20 is directed toward a source of radiation such as the sun, the radiation may be absorbed by the structure of the reflector, raising its temperature and possibly warping or destroying its structure. Even if the reflector is not affected, it may concentrate energy on, and destroy, feed 23.

A known scheme for reducing the problems described above is to cover the open radiating aperture of reflector 20 with a sunscreen or thermal barrier membrane (blanket), illustrated as sheet 24 in FIG. 1, exploded away from reflector 20. Sunscreen 24 may be attached to the rim of reflector 20 by means (not illustrated) such as adhesive, or it may be held by fasteners, such as Velcro tape.

Figure 2:
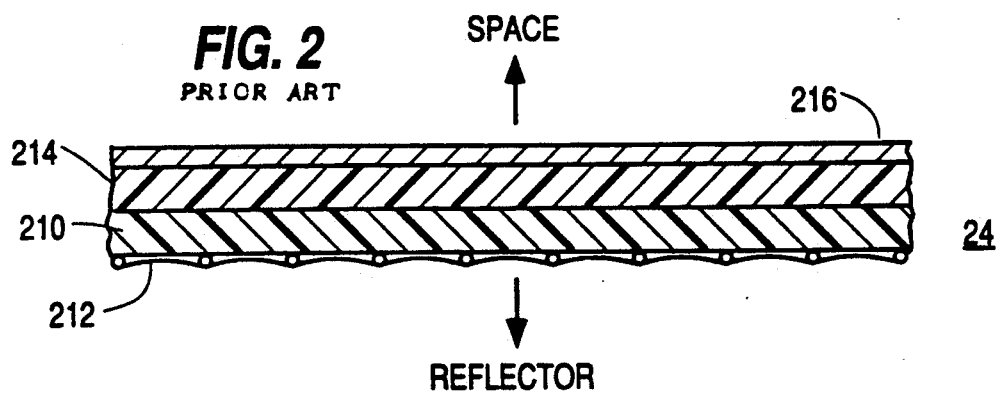
FIG. 2 is a cross-sectional view of a single structured layer sunscreen according to the prior art, which may be used as the sunscreen in FIG. 1 but which may not have a sufficiently long life span for some missions.

FIG. 2 illustrates in cross-sectional view a prior-art sunscreen which may be used with reflector 20 of FIG. 1. Sunscreen 24 of FIG. 2 is a single sheet-like structure, termed a "single" layer, to distinguish it from multilayer blankets which are also used in the art. A multilayer blanket may be similar to that described in the above-mentioned Munro, III et al. application, and includes plural, separated layers of dielectric, some of which may be coated. As mentioned above, such multilayer structures allow heat to build up among the layers, which rise in temperature and generate infrared radiation. The infrared radiation can heat the reflector, possibly causing warping or damage. Such multilayer blankets may be advantageous by virtue of decreasing the temperature rise of the inner layers when a source of radiation heats the outer layer, but the several layers interpose more mass between the antenna and free space than a single-layer blanket, and this additional mass may occasion more loss or attenuation for RF signals passing therethrough than a single-layer blanket. This attenuation may be particularly troublesome when RF signals must pass through the blanket twice, as may occur when the reflector feed must radiate through the blanket to the reflector, and back from the reflector through the blanket to space.

Single-layer blanket 24 of FIG. 2 includes a sheet 210 of black polyimide film about two mils (0.002 inch) thick. A layer 212 of polyester fiber mesh, such as Dacron polyester fiber or glass fiber mesh, is affixed to the reflector-facing side of polyimide sheet 210 by a hot-melt moisture-cure polyurethane adhesive (not illustrated). The space-facing side of polyimide film 210 is coated to a thickness of about four mils (0.004 inch) with a layer 214 of polyurethane paint such as Chemglaze Z202. An electrically conductive coating 216 such as vapor-deposited indium-tin oxide is deposited over the space-facing side of paint layer 214. In the presence of charged particles and solar ultraviolet radiation, the paint tends to turn brown, which is a visible indication of the degradation of its properties. As mentioned, the absorptivity $\alpha$ tends to rise from 0.3 toward 0.85, thereby tending to absorb more energy in the form of visible light and infrared, which therefore tends to raise the temperature of the sunscreen. The emissivity remains substantially constant, which means that the increased energy which the sunscreen absorbs tends to be reradiated as heat both toward space and toward the reflector. Also, the resistivity of the ITO coating tends to increase, thereby increasing the danger of ESD.

Figure 3:
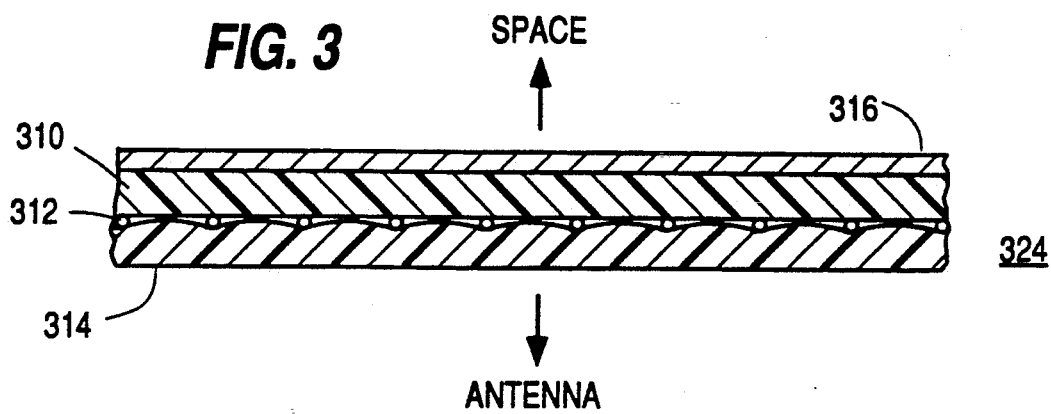
FIG. 3 is a cross-sectional view of a single structured layer sunscreen according to the invention, which may be used as a sunscreen in FIG. 1 and which is expected to have a longer mission life than the sunscreen of FIG. 2.

FIG. 3 illustrates a cross-section of a sunscreen 324 according to the invention, which may be used as sunscreen or membrane 24 of FIG. 1. The single structure of FIG. 3 includes a sheet 310 of transparent polyimide film about ½-mil thick (0.0005 inch). A suitable material is Kapton, manufactured by E.I. Du Pont de Nemours Company. A reinforcing web 312 of Dacron polyester fiber mesh or glass fiber mesh is affixed to the reflector-facing side of polyimide sheet 310 by a hot-melt moisture-cure polyurethane adhesive (not separately illustrated). A coating 316 of transparent indium-tin oxide is deposited on the space-facing side of polyimide sheet 310. Satisfactory performance has been achieved by a coating with a thickness of about 75±25Å, applied by a vapor deposition process by Sheldahl, whose address is 1150 Sheldahl Road, Northfield, Minn. 55057-0170. Such ITO coatings have a resistivity in the range of $10^6$ to $10^8$ ohms per square.

In accordance with an aspect of the invention, a layer 314 of white polyurethane paint is applied to the reflector-facing side of polyimide film 310, over reinforcing mesh 312 if a mesh is used. The aforementioned Chemglaze type Z202 may be used, or type S13-G/LO silicone paint, manufactured by Illinois Institute of Technology Research Institute, whose address is 10 West 35th Street, Chicago, Ill. Adhesion of the silicone paint is promoted by applying an adhesive primer (not separately illustrated) before applying the silicone paint. A suitable primer is made from A-1100, manufactured by Union Carbide Chemicals and Plastics Company, Inc., whose address is 318-24 4th Avenue, P.O. Box 38002, South Charleston, W.V. The primer is transparent, so the white silicone paint is visible from the space-facing side of sunscreen 324, through transparent ITO layer 316, transparent Kapton film layer 310, transparent or translucent mesh 312 and its adhesive, and through the transparent primer.

Sunscreen 324 of FIG. 3 has absorptivity $\alpha=0.291$, and an emissivity $e=0.91$ looking at the space-facing side. The paint is protected from charged particles by the Kapton film, and the film also absorbs a significant amount of solar ultraviolet light. Thus, polyurethane paint layer 314 receives less ultraviolet light than layer 214 of FIG. 2.

A sunscreen according to the invention was tested by exposure to a simulated space environment. The tests included exposure to ultraviolet light for 3525 equivalent sun hours (ESH), 400 thermal cycles from $-150°$ C. to $+150°$ C., and an exposure for 1024 ESH to the combined effects of electron fluence of $3\times10^{15}$ #/cm², a proton fluence of $4\times10^{14}$ #/cm², and UV light. The 3525 ESH UV test is equivalent to about 1½ years in orbit. The tests showed a change of $\alpha$ from 0.30 to 0.32 for the S13-G/LO paint, and from 0.41 to 0.42 for the Z202 paint, which is within the accuracy of the measurement. The emissivity was unchanged at 0.90 by the test, and the resistivity remained at $10^7$ ohms per square.

It has been observed that seven oven-curing of the polyurethane paint may produce conditions under which the reinforcement mesh tends to delaminate from the Kapton film. It is believed that this occurs because the solvents distilled from the paint are also solvents for the hot-melt moisture-cure polyurethane. A similar problem occurs with silicone paint. In both cases, the problem is avoided by the use of room temperature cure (air cure).

The single-structure or single-layer sunscreen may be manufactured by the following steps, in the order listed.

(a) attach reinforcing mesh to ½-mil Kapton film. The mesh may be polyester or glass fiber.

(b) deposit ITO coating on non-reinforced side.

(c) mask ITO-coated side to prevent painting thereof, by attaching TEXWIPE material, manufactured by TEXWIPE Company, whose address is P.O. Box 308, Upper Saddle River, N.J. 07458, or ½-mil Mylar film, with Kapton adhesive tape along the perimeter of the sample.

(d) paint reinforced side with primer; allow to dry.

(e) paint reinforced side with S13-G/LO.

(f) cure paint at room temperature (no higher than 30° C.) for seven days.

(g) remove masking material by cutting off the edges of the TEXWIPE or ½-mil Mylar.

If Chemglaze Z202 is used in step (e) above, step (d) is deleted, as no primer is needed.

Other embodiments of the invention will be apparent to those skilled in the art. For example, while the sunscreen has been described as a cover for a reflector antenna, it may be applied as a blanket around a portion of the spacecraft, as illustrated by sunscreen 26 of FIG. 1, illustrated exploded away from wall or face 14 of spacecraft body 12. As illustrated in FIGURE 1, an antenna 22 is flush-mounted in wall 14, and may radiate through sunscreen 26 when in place. Also, the reflector feed may be within the reflector, so that the feed is also protected against thermal effects by a membrane according to the invention placed over the mouth or opening of the reflector.

What is claimed is:

1. A thermal membrane for an antenna, comprising:
    a sheet of transparent dielectric film located between said antenna and space, to thereby define inner and outer surfaces of said sheet of dielectric film facing said antenna and space, respectively;
    a layer of transparent, electrically conductive material affixed to said outer surface of said sheet of dielectric film;
    a layer of white paint supported by said inner surface of said dielectric film;
    a polyester fiber reinforcing mesh affixed to said inner surface of said sheet of dielectric film.

2. A thermal membrane for an antenna, comprising:
    a sheet of transparent dielectric film located between said antenna and space, to thereby define inner and outer surfaces of said sheet of dielectric film facing said antenna and space, respectively;
    a layer of transparent, electrically conductive material affixed to said outer surface of said sheet of dielectric film, and
    a layer of white paint supported by said inner surface of dielectric film; and
    a glass fiber reinforcing mesh affixed to said inner surface of said sheet of dielectric film.

3. A thermal membrane for an antenna, comprising:
    a sheet of transparent dielectric film located between said antenna and space, to thereby define inner and outer surfaces of said sheet of dielectric film facing said antenna and space, respectively;
    a layer of transparent, electrically conductive material affixed to said outer surface of said sheet of dielectric film, and
    a layer of white polyurethane paint supported by said inner surface of said dielectric film.

4. A thermal membrane for an antenna, comprising:
    a sheet of transparent dielectric film located between said antenna and space, to thereby define inner and outer surfaces of said sheet of dielectric film facing said antenna and space, respectively;
    a layer of transparent, electrically conductive material affixed to said outer surface of said sheet of dielectric film, and
    a layer of white room-temperature-cured silicone paint supported by said inner surface of said dielectric film.

* * * * *